United States Patent [19]

Mitchelson

[11] Patent Number: 4,486,095
[45] Date of Patent: Dec. 4, 1984

[54] MOVEMENT MEASURING APPARATUS AND LANDMARKS FOR USE THEREWITH

[75] Inventor: David L. Mitchelson, Leicestershire, England

[73] Assignee: Movement Techniques Limited, Leicestershire, England

[21] Appl. No.: 355,586

[22] PCT Filed: Jun. 16, 1981

[86] PCT No.: PCT/GB81/00104
§ 371 Date: Feb. 22, 1982
§ 102(e) Date: Feb. 22, 1982

[87] PCT Pub. No.: WO82/00196
PCT Pub. Date: Jan. 21, 1982

[30] Foreign Application Priority Data
Jun. 27, 1980 [GB] United Kingdom ............... 8021164

[51] Int. Cl.³ ............................................. G01B 11/26
[52] U.S. Cl. .................................. 356/152; 250/226; 250/227; 356/141; 356/400
[58] Field of Search .................. 356/141, 152, 400; 250/226, 227

[56] References Cited
U.S. PATENT DOCUMENTS

| | | | |
|---|---|---|---|
| 3,456,997 | 7/1969 | Stites et al. | 250/226 |
| 3,571,571 | 3/1971 | Kapsambelis. | |
| 3,603,691 | 9/1971 | Hamilton | 356/152 |
| 3,668,409 | 6/1972 | Tuhro et al. | 250/236 |
| 3,809,477 | 5/1974 | Russell | 356/152 |
| 3,906,220 | 9/1975 | Delingat | 356/28 |
| 3,923,402 | 12/1975 | Turcotte | 356/152 |
| 4,090,070 | 5/1978 | Colomes | 356/141 |
| 4,123,165 | 10/1978 | Brown et al. | 356/152 |
| 4,356,395 | 10/1982 | Miller | 250/227 |

Primary Examiner—S. C. Buczinski
Attorney, Agent, or Firm—Buell, Blenko, Ziesenheim & Beck

[57] ABSTRACT

Movement of a body part or other movable object is measured by attaching a retro-reflecting landmark (8) to the body part. An observation field (4) containing the landmark (8) is scanned using a beam (20) of radiation from a lamp (10) and reflecting it with a rotatable mirror (18) to scan the field. The retro-reflected light (42) is detected and the time of retro-reflection by reference to the phase of rotation of the mirror (18) is measured to provide a signal related to the angular position of the landmark (8) in the field (4). More than one landmark (8) can be observed simultaneously by using landmark (8) with edge filtering characteristics and appropriate arrangements for discriminating retro-reflected light (42) according to spectral characteristics.

52 Claims, 18 Drawing Figures

MOVEMENT MEASURING APPARATUS AND LANDMARKS FOR USE THEREWITH

FIELD OF INVENTION

The invention relates to movement measuring apparatus and landmarks for use therewith. The invention can be used for measuring, recording and monitoring human motion in for example biomechanics, bioengineering and the study of motor skills in physiological psychology. In such applications landmarks are affixed to physical elements whose movement is to be measured. The invention can be used also to record contours by affixing the landmark to a wand or probe and moving the landmark across the physical element whose shape is to be recorded. The invention could also be used to program and control robots and similar manipulative machines. The versatility of movement measuring apparatus of the invention may permit other applications.

BACKGROUND OF INVENTION

The inventor has previously described a movement measuring apparatus referred to as CODA (see Mitchelson, D. L. 1975): Non-photographic techniques for movement analysis; in: Grieve, D. W. et al. Techniques for the analysis of human movement. Lepus, London; and Mitchelson, D. L. (1979): Bioengineering in motor function assessment and therapy; and in: Progress in Stroke Research, pp. 117–124. Ed. Greenhalgh, R. M. Clifford Rose, F. Pitman Medical, London.).

In such apparatus' landmarks were used in the form of LED's (light emitting diodes) which could be pulsed or modulated for distinguishing one landmark from another. Light impinging on multiple photodiode detector plates produced an analogue/digital signal indicative of the angular position of the LED landmark in the multiples photodiode observation field. The multiple photodiodes mounted on a plate were costly and the plate position had to be carefully calibrated to ensure reproducibility. The signal was a position-dependent signal and the accuracy of measurement obtainable was hence limited. The apparatus was costly and required skilled operatives.

There is also known a so-called SELSPOT system (made by Selective Electronic Company of Mölndal Sweden) using LED landmarks but a single multiple electrode photodiode producing an entirely analogue signal dependant on the horizontal and vertical position of the landmark in an observation field. Ambient light could influence measurements. Where 3-dimensional measurement is required separate measuring units have to be sited carefully in their appropriate relative positions. Again the apparatus was costly, difficult to use and liable to produce inaccurate or not reproducible results.

It is the object of the invention to provide a movement measuring apparatus which can improve on the aforementioned apparatus as regards manufacturing cost, ease of use, accuracy and/or reproducibility.

SUMMARY OF INVENTION

According to the invention there is provided a movement measuring system including a measuring apparatus for scanning an observation field and a suitably reflective landmark located in the observation field, said apparatus having:

(a) a means generating a beam of radiation; and a measuring unit comprising:

(b) a moving mirror reflecting the beam to scan the observation field;

(c) a means producing a signal related to the phase of movement of the mirror;

(d) a means producing a landmark detect signal when the landmark reflects radiation onto the mirror; and (e) a means producing a signal related to the angular position of the landmark in the observation field by reference to the mirror phase signal at the time of a landmark detect signal.

When the landmark reflects back to the moving mirror a signal can be obtained related to the angular position of the landmark in the field. The system is basically a scanning system. Because only the phase of mirror movement needs to be determined, the electronic arrangement can be relatively simple. No wires need to be connected to subjects under examination.

The landmark may be a single or a plurality of retro-reflecting objects. Suitably the retro-reflecting object has a plurality of reflecting surfaces at a 90° angle so as to retro-reflect in a wide range of angles of incident radiation.

The landmark may be in the form of a pyramidal retroreflector having quadrangular base sides of less than 5 millimeters. The small dimensions of the landmark facilitates the pinpointing of the angular position but may reduce the signal obtained. The overall structure permits the landmark to be in a wide range of different attitudes when retro-reflecting.

Preferably the landmark is from 10 to 18 mm at its base sides. Most suitably the landmark is 14 mm wide. An increased landmark size helps to improve the strength of the signal and relatively small detriment of the accuracy of measure.

In commerce, the apparatus and landmark can be sold separately of one another.

The movable mirror may reciprocate or may be a two-sided flat rotatable mirror. Preferably the movable mirror is a rotatable drum mirror. The mirror has at least six facets to enable a large number of measurements to be made quickly.

Mirror phase signals may be produced in different ways. In a first embodiment an angular movement transducer is connected to the mirror drum for producing the mirror phase signal. This gives potentially a high accuracy even if motor speeds fluctuate. In a second embodiment the mirror drum is rotatable at a substantially constant speed, means are provided for detecting the reflection of radiation from the mirror drum in a predetermined angular position thereof and producing a phase related reference signal and a mirror phase signal is produced by reference to a time lag between the phase related reference signal and the landmark detect signal. The phase related reference signal may be a signal occurring when a scan starts. This gives an accurate mirror phase signal but the reference signal may have to be subjected to mathematical adjustments to accurately indicate the mirror phase.

It is also possible to use a substantially constant speed motor with in addition an angular movement transducer to compensate for small motor speed variations.

The apparatus of the invention can be constructed in a simple manner using fibre-optic components. In one form of construction fibre optic means are provided for conveying outgoing radiation from the radiation generating means to a focal line and for conveying incoming radiation from the same focal line to the means for producing the landmark detect signal. One focal line thus serves for outgoing and incoming radiation, greatly simplifying the optical arrangement. Advantageously the mirror surfaces are planar and a lens is located between the focal line and the mirror to collimate outgoing radiation and focus incoming radiation.

In one alternative construction a silvered mirror or similar beam splitting arrangement could be used so that outgoing and incoming light can be processed by separate devices.

In a preferred arrangement however the fact that the retroreflector reflects light is off-set parallel to the incident light (as a result of successive reflections internally of the retro-reflecting landmark) is used to reflect outgoing and incoming light using different mirror drum facets. A maximum signal can be measured when about half of the radiation leaving the mirror is reflected by a facet so that a substantial part of light is retroreflected for measurement. The outgoing and incoming light can be processed by separate devices, yet good signal to noise ratios may be obtained. The signal builds up and degrades fast up to and from the maximum signal, permitting electronic processing of the measurement. The devices for processing outgoing and incoming light can be designed for optimum performance for their respective functions. Using this system of course multi-facetted drum mirrors have to be used to permit two adjacent facets to reflect incoming and outgoing light.

Using the preferred arrangement incoming and outgoing light can be treated differently so as to give the best measurement position.

As to the outgoing light, this is preferably produced using a fibre-optic slit to provide a narrow beam of light and a circular lens of the Fresnel type to collimate the beam and provide an even light intensity throughout the beam. As to the incoming light, this is preferably focussed by a cylindrical lens to convert the incoming beam into beam focused on a fibre optic slit. The fibre optic arrangement permits the retroreflected light to be captured at whatever position along the lens the light impinges. The fibre optic arrangement also permits a cross-sectional transformation for Littrow auto-collimation and measurement of varying intensities of light in different parts of the spectrum in the retroreflected light.

Surprisingly the equipment can be adapted to deal with a considerable number of landmarks simultaneously facilitating the measurement of movement in three dimensions.

The invention in that event utilizes landmarks each having a radiation filtering characteristic so as to reflect only part of an incident spectral range of radiation and preferably an edge filtering characteristic. The apparatus can then distinguish between different landmarks in a preferred form in which the means for passing a beam of radiation includes a source adapted to produce a spectrum of radiation wavelengths for impinging on a plurality of landmarks having specific spectral reflecting characteristics and the means for producing a landmark detect signal include opto-electrical means for discriminating between the reflection of different landmarks. Conveniently a plurality of measuring units (arranged for example to permit measurement of a movement in three dimensions) each receive radiation from a common generating means by fibre-optic means.

The discrimination of incoming radiation can be effected in different but surprisingly convenient ways. Suitably the opto-electrical means include a plurality of filters for inter-acting with incoming radiation and a plurality of sensors associated with each of the filters so as to de-code incoming radiation according to its spectral characteristics and so as to provide a specific landmark detect signal for each of a plurality of landmarks. Preferably the opto-electrical means include a radiation diffraction means for interacting with incoming radiation and a plurality of sensors associated with different bands of the spectrum diffracted so as to de-code incoming radiation according to its spectral characteristics and so as to provide a specific landmark detect signal for each of a plurality of landmarks.

The de-coding can be arranged in a simple way using fibre-optics and analogue summing network conversion of grouped sensor outputs. The retro-reflection characteristics of the landmarks do not give rise in such an arrangement to a unique output at a specified sensor with other sensors "silent" but create a plurality of outputs at a number of sensors. The analogue summing network can be arranged so that only a particular group of sensors create a meaningful signal whereas all other groups of sensors (which may partially overlap with the particular group of sensors) give a non-discriminating signal such as zero. Thus the combined use of retro-reflecting landmarks having edge filter characteristics and analogue summing networks permits the creation of a meaningful signal for each landmark even though the retro-reflection of different landmarks impinges on the same sensors.

The apparatus of the invention can thus be adapted for the measurement of three dimensional movement using simple landmarks not connected to a power supply and in broad daylight avoiding the need for special lighting conditions. The apparatus can be set up easily and can be sold in calibrated condition. The apparatus is of simple construction.

DRAWINGS

Figure 14:
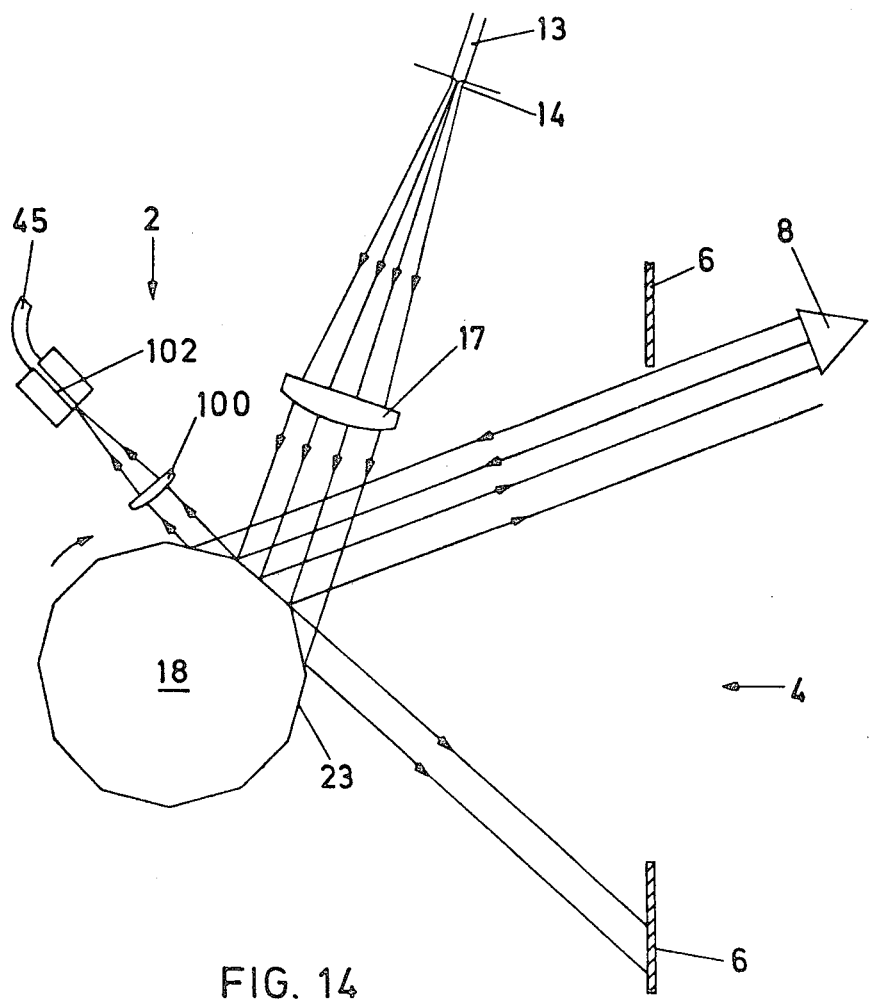
FIG. 14 is a plan view of another measuring head of an apparatus according to the invention.
Figure 16A:
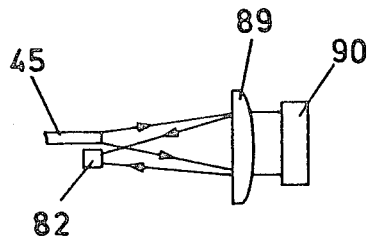

FIGS. 16A, B, C shows an elevation, plan and perspective view respectively of the electro-optical part for differentiating landmark reflections having different spectral characteristics of the apparatus of FIG. 14.

SPECIFIC DESCRIPTION

Individual measuring unit

Figure 1:
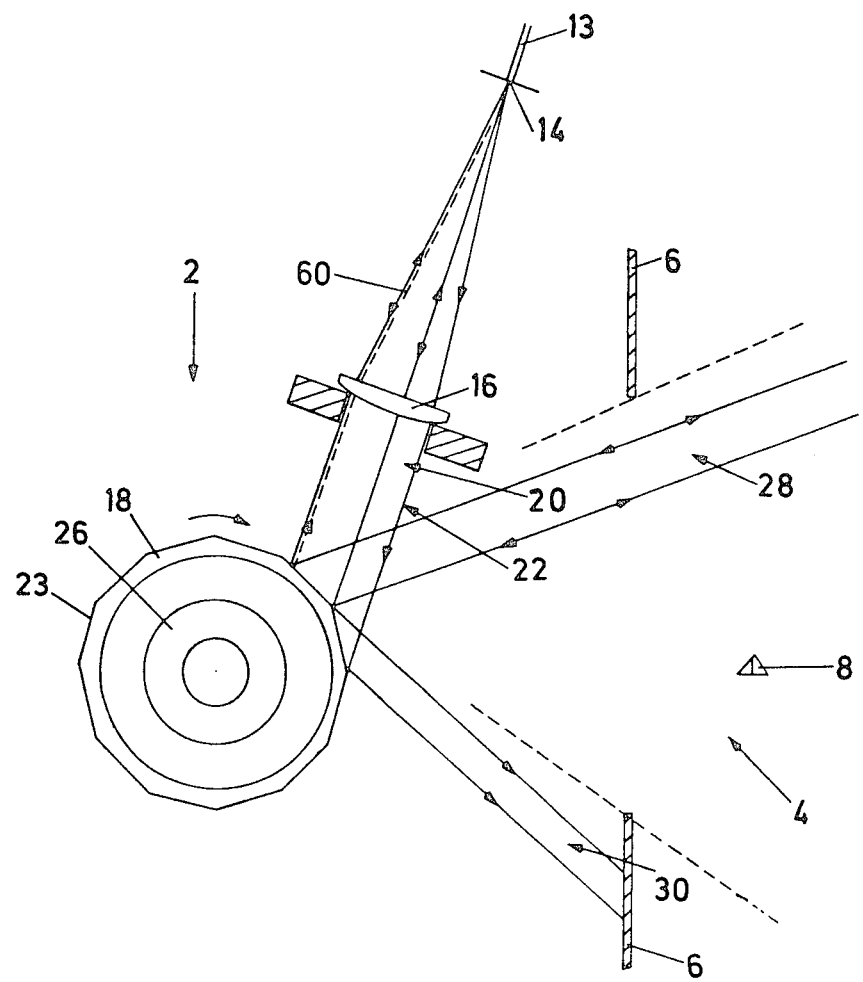
FIG. 1 is a plan view of a measuring head of an apparatus according to the invention.
Figure 2:
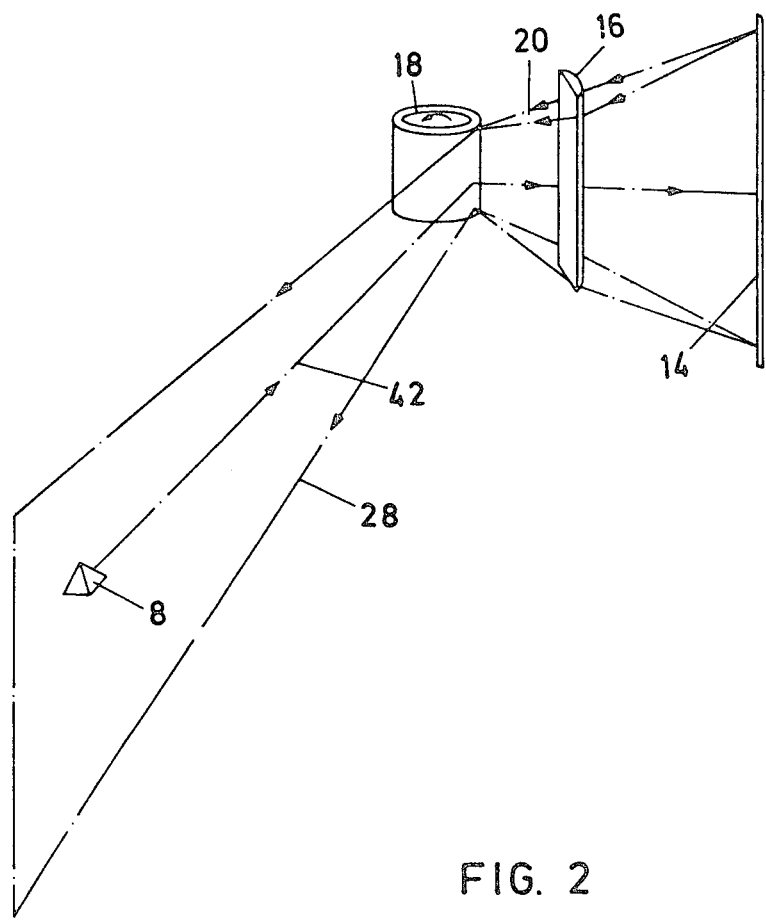
FIG. 2 is a perspective part view of the head of FIG. 1.
Figure 3:
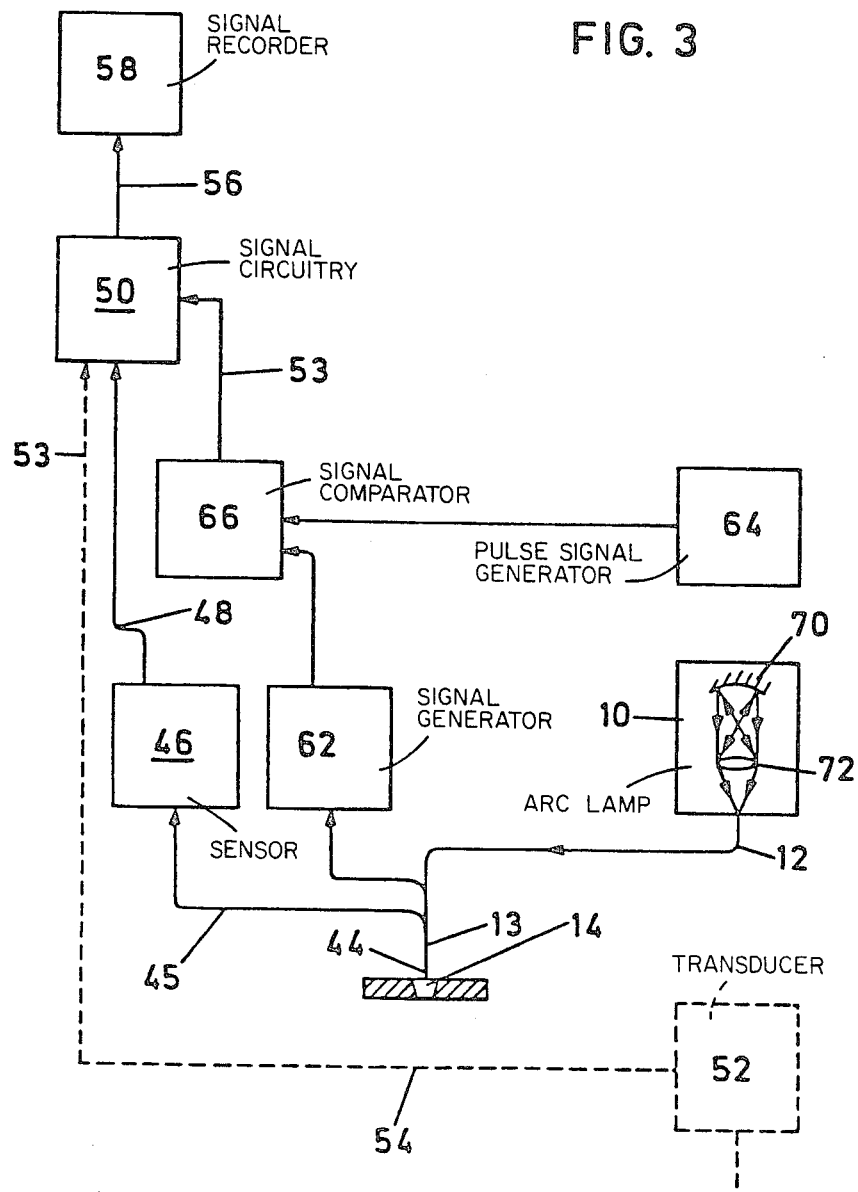
FIG. 3 is a schematic diagram of an opto-electrical system associated with the measuring head of FIGS. 1 and 2.

A measuring apparatus incorporating a single measuring unit is illustrated by FIGS. 1 and 2 which shows the measuring head from a fibre optic slit onwards and by FIG. 3 which shows the opto-electrical system up to the slit.

The measuring head 2 scans an observation field 4 between the field limits defined by field stops 6. A landmark 8 is located in the field 4. A means for generating a beam of radiation in this case in the form of a 30 W to 300 W xenon-arc lamp generally indicated at 10 (FIG. 3). The light is focussed by a reflector 70 and a lens 72 for conveying through a fibre optical cable 12. The cable 12 is split (FIG. 10) and the individual split cables 13 are located in a fibre optic slit 14 which is 0.15 mm (millimeters) wide and 140 mm high. The xenon-arc lamp should be of appropriate strength for the optical system concerned and could be from 15 to 70 Watts or go up to 300 W or higher. Other sources could be used with a broad band spectrum which is preferred for multiple landmark measurement as explained by reference to FIGS. 7 to 13. Other broad band sources include tungsten filament lamps. Narrow band sources can be used for single landmark measurements. The xenon-arc radiation include wave lengths of from 300 millimicron in the ultra-violet range, the range of visible light up to infra-red light of 1000 millimicron. Light from the slit 14 (FIG. 1) is collimated by a cylindrical lens 16 so that a beam 20 is defined on its sides by parallel lines 22 approximately 15 millimeters apart. As shown in FIG. 2, the beam 20 is fan-shaped when seen sideways. The lens 16 may alternatively be a two or three element compound lens system to reduce optical aberrations such as spherical aberration, chromatic aberration or astigmatism.

The beam 20 is incident on an aluminium mirror drum 18 constituting a moving mirror having twelve optically flat sides or facets 23. The drum 18 is rotated at a substantially constant speed of 1500 r.p.m. by a synchronous motor 24 having a shaft keyed to a central hub portion 26 of the drum 18. The sides 22 are approximately 12 millimeters wide so that the beams 20 is split into two. The screening elements 6 permit one beam 28 to scan the field 4 whereas the other beam 30 is screened out before becoming effective. Only one beam from the drum 18 ever scans the field 4. Thus 300 scans per second are produced through the field 4.

Figure 4:
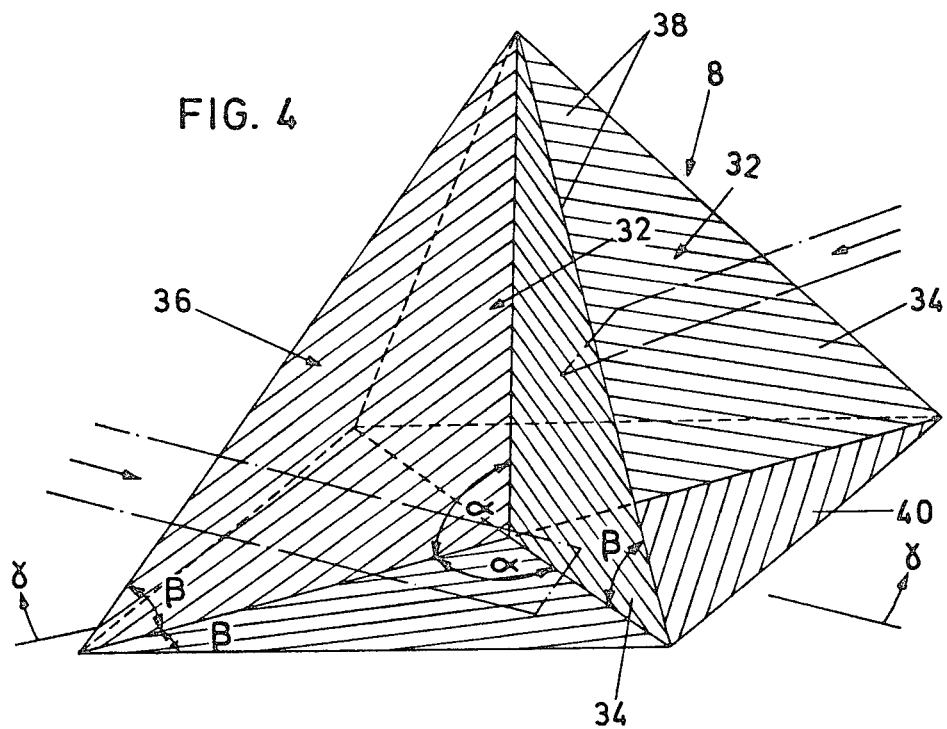
FIGS. 4, 5 and 6 are a perspective view, top and side view respectively of a landmark according to the invention.
Figure 5:
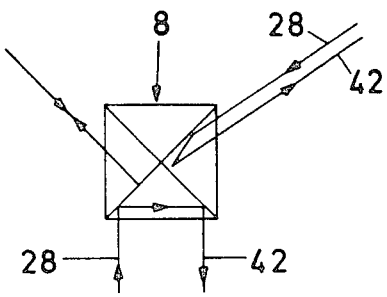
Figure 6:
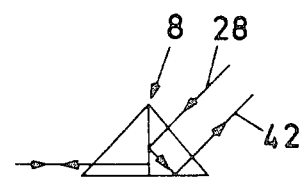

The landmark 8, in the form of a pyramidal retroreflector (see FIGS. 4 to 6), is made up out of four individual prisms 32. Each prism has three adjacent triangular side faces 34. Each side face has one 90° angle α and two 45° angles β and is treated to make it reflective. The remaining fourth side face 36 is an equilateral triangle and is transparent. The reflective side faces 34 are brought together so as to provide a reflective base plane 40 and two reflective planes 38 passing through the diagonals of the base plane 40. All reflective surfaces 38 and 40 are at a 90° angle. The result is that the landmarks act as a retro-reflector because it reflects light in the same direction as the light incident upon it through an arc γ of about 200 degrees. FIG. 5 illustrates retroreflection of light involving the two diagonal planes 38. FIG. 6 illustrates retro-reflection of light involving the base plane 40 and one diagonal plane 38. Collimation of light is maintained after retro-reflection. Please note that any retroreflected causes a slight sideways shift of the incident and reflected light although the direction does not change. The sides of the base plane 40 of the pyramid formed are only 3 millimeters (mm) long so as to enable its movement to be accurately measured. For certain long range measurements the base plane sides may be in excess of 5 mm.

In use, as the beam 28 scans the field 4, the landmark 8 will retro-reflect light 42 (see FIG. 2) in the same direction as it arrives but only when the outgoing beam 28 is incident upon the landmark. The retro-reflected light 42 returns approximately by the same path and arrives at the slit 14. The retro-reflected light 42 is conveyed (see FIG. 2) through a series of fibre optic cables 44 evenly distributed along the slit 14 (see FIG. 10). The cables 44 are then combined and passed to a photosensor 46 by a single cable 45. The sensor 46 produces a landmark detect signal 48. This signal is an input to circuitry 50 for producing a signal related to the angular position of the landmark 8 in the field 4. The retro-reflected light can reach the slit 14 at different heightwise positions depending on the heightwise position of the landmark 8 in the beam 28. Whatever the height of the landmark 8, the landmark detect signal is the same and related solely to the angular position of the landmark 8 in the field 4.

It is to be noted that the retro-reflection can occur at all angular positions of the landmark 8 in the field 4 and the landmark detect signal cannot, on its own, provide any indication of the landmark position. To determine the landmark position it is necessary to relate retroreflection to the angle of the beams 28 and 42 or the phase of movement of the mirror. This can be done for example in two ways.

In a first embodiment, the angular movement transducer 52 is coupled to the motor 24 so as to provide a series of successive signals 53 each specific to a particular angle of the flat sides 22 on which the beam 20 is incident. A signal 54 related to the phase of movement of the mirror drum can be then supplied to the circuitry 50 so as to provide an output signal 56 related to a particular angular position of the landmark 8. The signal 8 can be recorded and/or displayed at 58 by appropriate equipment.

In a second embodiment, the items in dotted lines in FIG. 3 are omitted. A phase related signal is produced as follows. At one particular angle, each flat side 23 reflects directly to the slit 14 as shown by line 60 in FIG. 1. The reflected light can be detected and so provides a reference signal at 62 indicative of a particular drum position. At the same time a high frequency clock pulse signal is generated at 64. The reference signals and clock pulse signals are compared at 66 to provide a series of successive signals 53 each related to a particular drum rotational angle, as the drum rotates at a constant known speed.

Other expedients for providing a signal related to the angle beam 28 at the moment of retro-reflection by the landmark 4 can also be used.

Using the apparatus the landmark angle can be accurately and quickly determined. The measurement can be effected using relatively few components as the incoming and outgoing light follow substantially the same path. Once manufactured, few calibration problems should arise. It is not necessary to use LED's as landmarks.

Multiple measuring units

Figure 7:
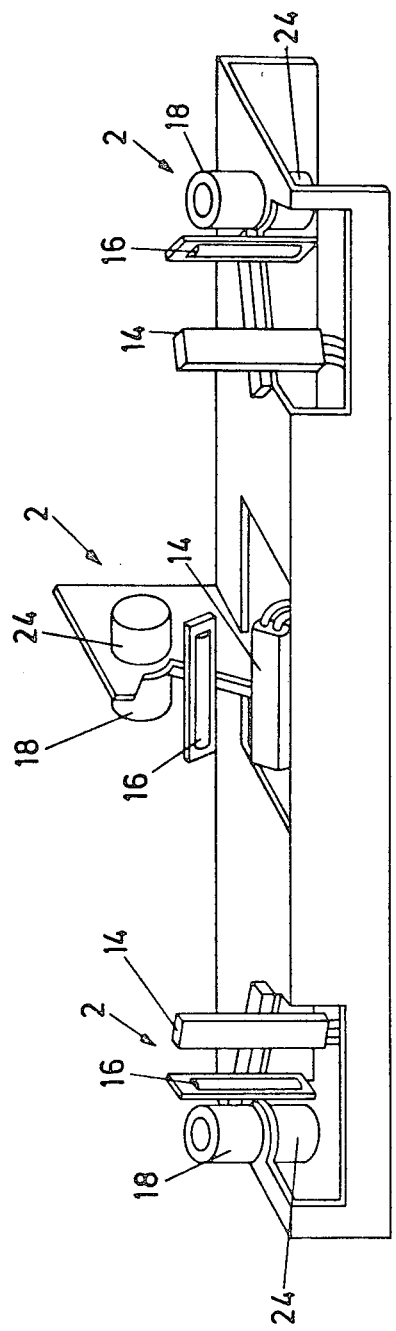
FIG. 7 is a perspective part view of an apparatus according to the invention incorporating three measuring units as illustrated in FIG. 1 for 3-D measurement.
Figure 9:
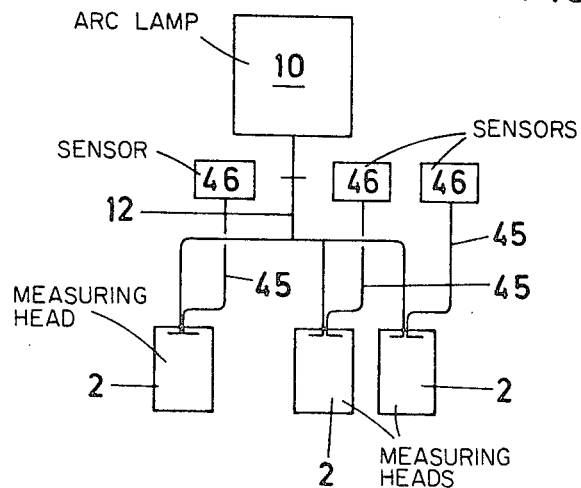
FIG. 9 is a schematic diagram of the opto-electrical system of the apparatus of FIG. 7.
Figure 10:
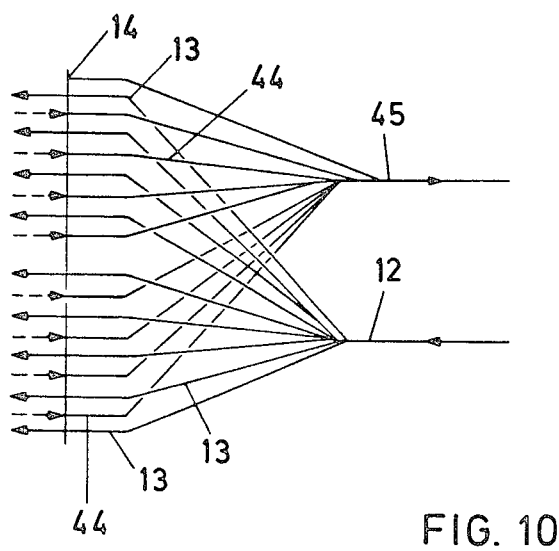
FIG. 10 is a schematic diagram of the fibre optics associated with a focal slit of the respective units of the apparatus of FIG. 7.

With references to FIGS. 7 and 9, the three measured heads 2 can be combined to provide measurement of landmark movement in three dimension in a manner the same as the CODA apparatus. In most uses which involve composite movements, and movements in three dimension, it is desirable to measure the movement of a number of landmarks.

The xenon-arc lamp 10 (FIG. 3) produces a collimated beam of light for passing through the cable 12. The light is then split and conveyed to each of the measuring heads 2 where the light is evenly emitted along the slit 14 by the cables 13 as previously described.

Figure 8:
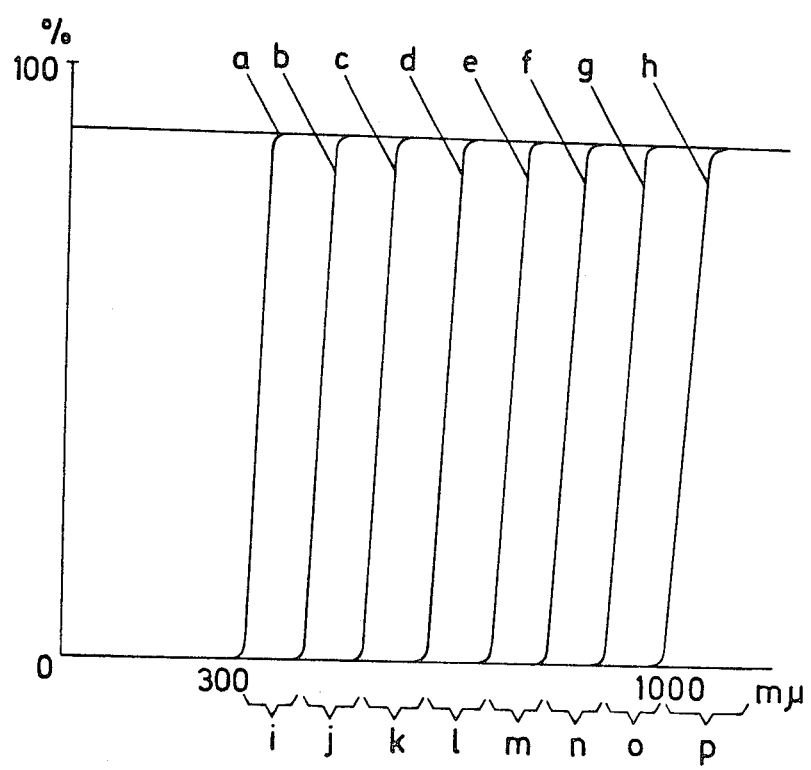
FIG. 8 is a graph of different spectral reflecting characteristics of different landmarks for use with the apparatus of FIG. 7.

The landmarks 4 each have different spectral reflecting characteristics by covering their transparent surfaces with appropriate edge filter materials such as gelatin Wratten edge filter produced by Kodak or by making them from doped glass such as Schott colour glass. FIG. 8 shows that a large number (eight) of different characteristics can be provided but the different transmission spectra overlap at the red end of the spectrum. The different characteristics have been indicated by a to h. The portions between successive edges have been indicated by i to p.

The incoming landmark detect signals passing through cables 44 are all led through the cable 45 to opto-electrical systems for de-coding and differentiating incoming reflections. Because the reflecting characteristics of the landmark overlap, a number of photosensors 82 have to be arranged to sense a unique part of the incoming light. Outputs from the photosensors are supplied to an analogue summing network 84 in which the photosensor signals are analysed to provide landmark detect signals specific to a particular landmark. The specific landmark detect signals (marked a to h in FIGS. 11 and 13) are then supplied to a band pass filter 88 for 20 to 40 KiloHerz to eliminate the effect of noise and spurious reflections.

Figure 11:
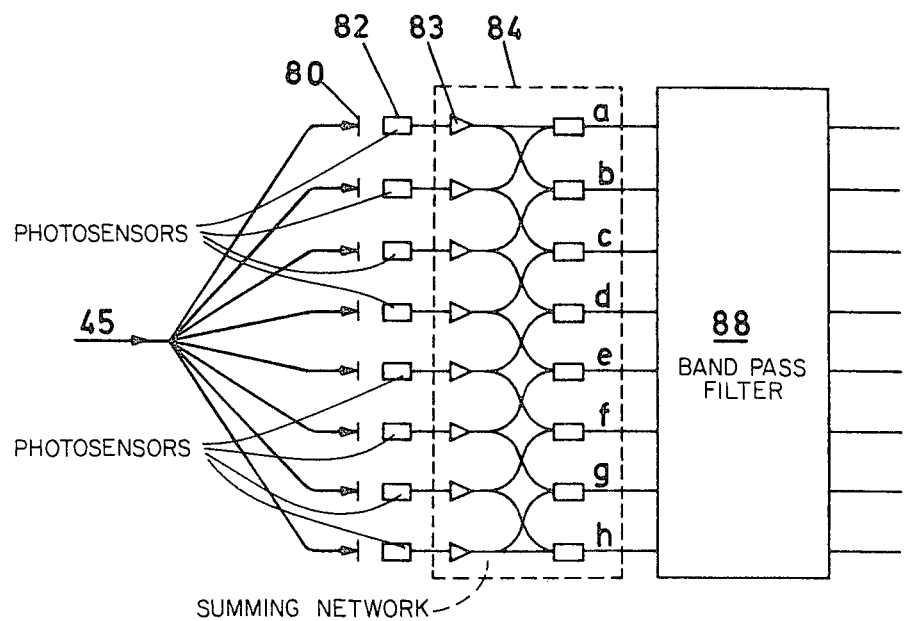
FIG. 11 is a schematic diagram of one opto-electrical system for differentiating landmark reflections having different spectral characteristics.
Figure 12:
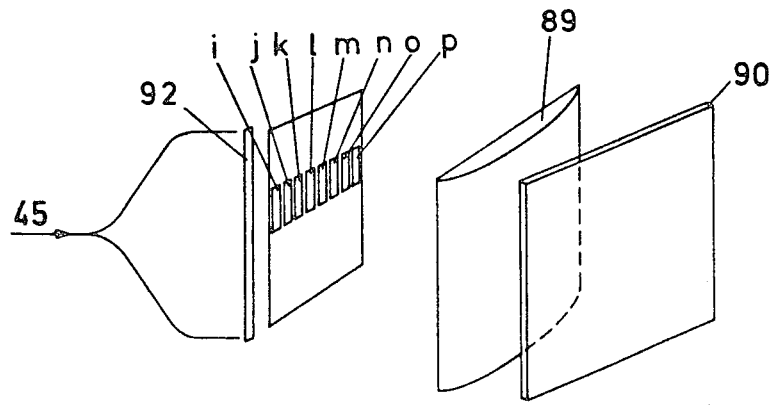
FIG. 12 is a schematic diagram of the optical part of another opto-electrical system for differentiating landmark reflections having different spectral characteristics.
Figure 13:
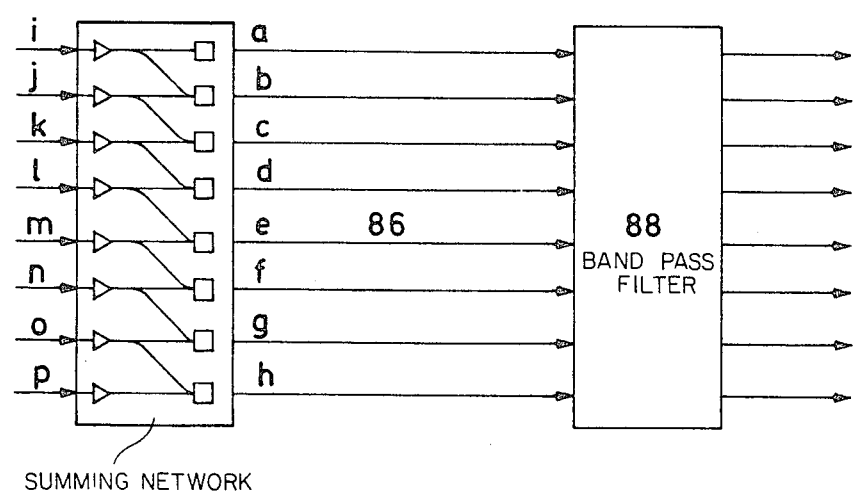
FIG. 13 is a block diagram of an electrical conversion circuit for differentiating landmark reflections received through the optical arrangement of FIG. 12.

The incoming landmark detect signals can be analysed and de-coded in two ways illustrated in FIG. 11 and in FIGS. 12 and 13.

With reference to FIG. 11, the light from the cable 45 is split and conveyed to eight gelatine edge filters 80 having a spectral transmission characteristic a to h as illustrated in FIG. 8 and corresponding to the landmark characteristics. From the filters the light passes to the photosensors 82 whose outputs are amplified to the level shown in Table 1. This is effected by adjusting amplifiers 83 so that the difference in the energy of light transmitted by adjacent edge filters becomes a constant value E. The last filter 80 having filter characteristic h cannot be set in this way and is set to have a total energy CxE, C being larger than 1. The energy sensed by the sensors 82 and the resulting outputs vary considerably depending on the particular landmark reflection and filter transmission characteristics. The number of sensors 82 receiving radiation also varies. Nevertheless the analogue conversion ensures that output signals 86 are specific to a particular landmark and of similar magnitude.

TABLE 1

| INPUT | | | OUTPUT Resulting from following landmark characteristics (letters refer to spectral characteristics as illustrated in FIG. 8) | | | | | | | |
|---|---|---|---|---|---|---|---|---|---|---|
| Transmission characteristics filters 52 (letters refer to spectral characteristics as illustrated in FIG. 8) | Amplifiers set to give indicated response to unfiltered light from sensors 82 | ANALOGUE SUMMING NETWORK CONVERSION at 84 | a | b | c | d | e | f | g | h |
| a | $7E + CE$ | $a - b$ | E | 0 | 0 | 0 | 0 | 0 | 0 | 0 |
| b | $6E + CE$ | $b - \frac{1}{2}(a + c)$ | 0 | $\frac{1}{2}E$ | 0 | 0 | 0 | 0 | 0 | 0 |
| c | $5E + CE$ | $c - \frac{1}{2}(b + d)$ | 0 | 0 | $\frac{1}{2}E$ | 0 | 0 | 0 | 0 | 0 |
| d | $4E + CE$ | $d - \frac{1}{2}(c + e)$ | 0 | 0 | 0 | $\frac{1}{2}E$ | 0 | 0 | 0 | 0 |
| e | $3E + CE$ | $e - \frac{1}{2}(d + f)$ | 0 | 0 | 0 | 0 | $\frac{1}{2}E$ | 0 | 0 | 0 |
| f | $2E + CE$ | $f - \frac{1}{2}(e + g)$ | 0 | 0 | 0 | 0 | 0 | $\frac{1}{2}E$ | 0 | 0 |
| g | $E + CE$ | $g - \frac{1}{2}(f + h)$ | 0 | 0 | 0 | 0 | 0 | 0 | $\frac{1}{2}E$ | 0 |
| h | $CE$ | $h - kg$ | 0 | 0 | 0 | 0 | 0 | 0 | 0 | $\frac{CE}{1+C}$ |

$$\left( K = \frac{C}{1+C} \right)$$

For example if landmark a of the landmarks 8 retroreflects, sensor 82 behind filter 80 having characteristic d receives: $4E + CE$ Sensor 82 behind filter 80 having characteristic e receives: $3E + CE$ Sensor 82 behind filter 80 having characteristic f receives: $2E + CE$ Analogue conversion for the output opposite the sensor 80 behind a filter with characteristic e gives $$e - \tfrac{1}{2}(d+f) = [3E + CE] - \tfrac{1}{2}[(4E + CE) + (2E + CE)] = 0$$

Similarly other outputs opposite sensors behind filters with characteristics b,c,d,f,g,h will be zero even though radiation is received by all sensors 82 in this case.

Only the output opposite the sensor with filter a will produce a signal:

$$a-b=(7E+CE)-(6E+CE)=E$$

Similarly the output opposite the sensor with filter e will respond only to retro-reflection by the landmark with characteristic e as follows:

$$e\tfrac{1}{2}(d+f)=(3E+CE)-\tfrac{1}{2}[(3E+CE)+(2E+CE)]=\tfrac{1}{2}E$$

Even in more complicated circumstances, where say two landmarks retroreflect at the same time, two outputs will be produced specific to each landmark. The presence of other light source near a retroreflecting landmark (such as room lights, windows) has no effect. Care must be taken to exclude radiation with sharply defined spectra which could interfere with a satisfactory operation.

Filters 80, sensors 82, network 84 and filter 88 occupy the position of the sensor 46 in FIG. 3. The overall lay-out is otherwise the same.

With reference to FIGS. 12 and 13, the light from cable 45 is passed to slit 92. A Littrov auto-collimation configuration uses a spherical lens 89 and a reflecting type diffraction grating to split up the incoming spectra. The split light is reflected through the lens 89 and can be sensed by sensors 82 lying in the same plane as the slit 92. Depending on the wavelength of the reflected light, the light impinges on eight photosensors 82 marked i to p in FIG. 12; i to p corresponding to the portions marked in FIG. 8. The photosensor output is amplified at 83 as previously. An analogue conversion is then effected by the network 84 as illustrated in Table 2.

sideways by successive reflections internally of the landmark 8, some of the sideways off-set radiation thus impinges upon the next facet 23 coming up due to mirror drum rotation. The radiation reflected from this later facet is focussed by a plano-convex cylindrical lens 100 and passes to a further fibre optic slit 102. The retro-reflected light can then be treated in the same way as the light passing through the aforementioned cables 45.

Figure 15:
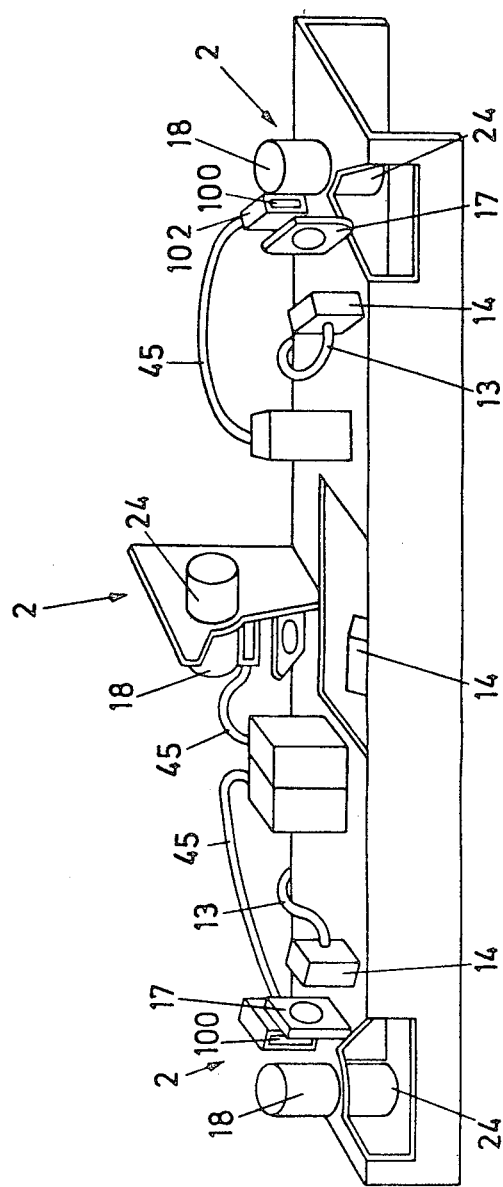
FIG. 15 is a perspective view of an apparatus according to the invention incorporating three measuring heads as illustrated in FIG. 14 for 3-D measurement.

FIG. 15 shows a 3-D measuring arrangement with a particular Littrow auto-collimation arrangement of the general type also shown in FIG. 12. The details of the present arrangement are illustrated in FIGS. 16A, B,C and show the use of a concentrated beam of light to provide a spread out, spectrally divided return beam of light onto a photodiode, preferably a Centronics LD-20-5T device. The diffraction grating of PTR optics 600 lines per mm blased for 4000 Å cooperates with a Fresnel autocollimation lens (f=50 mm, diameter of 50 mm).

I claim:

1. A movement measuring system using a beam with different spectral components which is reflected by a rotating mirror to scan an observation field containing retro-reflectors filtering incident radiation differently, and using an arrangement responsive to the retro-reflection of different spectral components to produce a signal specific to the landmarks, characterised in that the beam has a broad-band spectrum and the landmarks have edge filtering characteristics so that retro-reflection from different landmarks produces different but overlapping spectral ranges and in that sensors are exposed to different

TABLE 2

| INPUT | | | OUTPUT | | | | | | | |
|---|---|---|---|---|---|---|---|---|---|---|
| Spectral range diffracted (letters refer to spectral characteristics as illustrated in FIG. 8) | Amplifiers set to give indicated response to unfiltered light from sensors 82 | ANALOGUE SUMMING NETWORK CONVERSION at 84 | Resulting from following landmark characteristics (letters refer to spectral characteristics as illustrated in FIG. 8) | | | | | | | |
| | | | a | b | c | d | e | f | g | h |
| i | E | i | E | 0 | 0 | 0 | 0 | 0 | 0 | 0 |
| j | E | j − i | 0 | E | 0 | 0 | 0 | 0 | 0 | 0 |
| k | E | k − j | 0 | 0 | E | 0 | 0 | 0 | 0 | 0 |
| l | E | l − k | 0 | 0 | 0 | E | 0 | 0 | 0 | 0 |
| m | E | m − l | 0 | 0 | 0 | 0 | E | 0 | 0 | 0 |
| n | E | n − m | 0 | 0 | 0 | 0 | 0 | E | 0 | 0 |
| o | E | o − n | 0 | 0 | 0 | 0 | 0 | 0 | E | 0 |
| p | E | p − o | 0 | 0 | 0 | 0 | 0 | 0 | 0 | E |

Again, the analogue conversion ensures that the channel, which includes sensor 82 receiving spectral portion i, only gives an output when landmark with reflecting characteristic a retroreflects. All other landmark retroreflection gives a zero output at that channel.

Figure 16B:
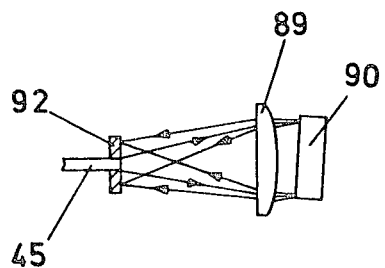
Figure 16C:
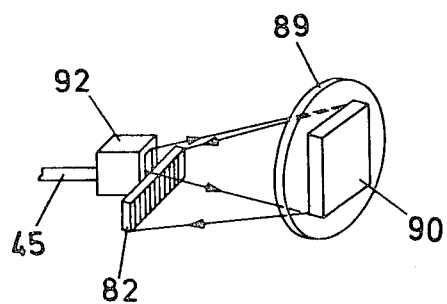

Individual measuring unit (FIGS. 14 to 16)

FIG. 14 shows the fibre optic cable 12 supplying radiation from a source which radiation is collimated by a Fresnel lens 17 to provide a narrow beam of radiation with diverging and lower margins. The aluminium mirror drum 18 has one facet 23 at any one time which scans the observation field 4 containing the landmark 8.

Incident radiation is reflected at an angle from the facet 23. At one angular drum position the reflected radiation is reflected by the landmark. Due to the fact, noted previously, that the landmark reflects incident and reflected light parallelly as some radiation is off-set spectral parts of retro-reflected radiation to produce first signals supplied to an electronic conversion network to de-code the radiation by comparing first signals of a plurality of grouped sensors so as to create a second meaningful landmark detect signal whereas other groups of sensors also receiving retroreflected radiation give a non-discriminating signal to thereby determine the angular positions of the landmarks in the observation field by reference to the phase of mirror rotation at the time a second meaningful landmark detect signal is produced.

2. A system according to claim 1 in which the landmark is a pyramidal retro-reflector having a quadrangular base.

3. A system according to claim 1 or claim 2 in which the rotatable mirror is rotated at a substantially constant speed and means are provided for detecting radiation reflected at a predetermined angular position and so producing a reference signal related to the phase of mirror rotation and a signal indicative of landmark position is produced by reference to the time lag between the phase related signal and the second landmark detect signal.

4. A system according to claims 1 or 2 in which first fibre optic means are provided for conveying outgoing radiation from a radiation generating means along the length of a narrow slit parallel to the axis of mirror rotation to provide the beam of radiation and a lens is located between the focal line and the mirror to collimate outgoing radiation and second fibre optic means are provided interspersed with the first along the length of the slit for conveying retro-reflected radiation focussed by the same lens to the sensors.

5. A system according to claims 1 or 2 in which first fibre optic means are provided for conveying radiation from a radiation generating means along the length of a first narrow slit parallel to the axis of rotation of the mirror to provide a beam of radiation and a first lens is located between the first slit and the mirror to collimate outgoing radiation and second fibre optic means are provided leading from a second narrow slit parallel to the axis of rotation of the mirror for conveying retro-reflected radiation focussed by a second lens to the sensors, the mutual angle of reflecting mirror surfaces and the angle between the first and second slits being arranged so that outgoing radiation from the first slit reflected by one surface is retro-reflected via another surface to the second slit.

6. A system according to claim 4 in which three rotatable drum mirrors are arranged so that one scans for landmarks to produce the landmark location with respect to a plane and a third one scans for landmarks at right angles to the pair to provide a number of second signals indicative of the landmark postion in three dimensions, each unit receiving broad band spectrum radiation from a common source through fibre-optic means.

7. A system according to claims 1 or 2 in which incoming retro-reflected radiation is split up and parts thereof, with the same spectral characteristic as the incoming radiation, are arranged to pass through a plurality of filters and the sensors measure the overall intensity of the split up radiation, the filters having edge filtering characteristics corresponding to those of the landmarks.

8. A system according to claims 1 or 2 in which incoming retro-reflected radiation is led to a radiation diffraction means to split it up and parts thereof, each with distinct non-overlapping spectral ranges are arranged to impinge on the sensors to measure the intensity of the respective parts.

9. An apparatus according to claims 1 or 2 including a source of broad-band radiation, a rotatable mirror, sensor and electronic network.

10. An apparatus according to claim 1 including a retro-reflecting landmark of pyramidal shape having quadrangular base and an edge filtering characteristic.

11. A system according to claim 3 in which first fibre optic means are provided for conveying outgoing radiation from a radiation generating means along the length of a narrow slit parallel to the axis of mirror rotation to provide the beam of radiation and a lens is located between the focal line and the mirror to collimate outgoing radiation and second fibre optic means are provided interspersed with the first along the length of the slit for conveying retro-reflected radiation focussed by the same lens to the sensors.

12. A system according to claim 3 in which first fibre optic means are provided for conveying radiation from a radiation generating means along the length of a first narrow slit parallel to the axis of rotation of the mirror to provide a beam of radiation and a first lens is located between the first slit and the mirror to collimate outgoing radiation and second fibre optic means are provided leading from a second narrow slit parallel to the axis of rotation of the mirror for conveying retro-reflected radiation focussed by a second lens to the sensors, the mutual angle of reflecting mirror surfaces and the angle between the first and second slits being arranged so that outgoing radiation from the first slit reflected by one surface is retro-reflected via another surface to the second slit.

13. A system according to claim 4 in which first fibre optic means are provided for conveying radiation from a radiation generating means along the length of a first narrow slit parallel to the axis of rotation of the mirror to provide a beam of radiation and a first lens is located between the first slit and the mirror to collimate outgoing radiation and second fibre optic means are provided leading from a second narrow slit parallel to the axis of rotation of the mirror for conveying retro-reflected radiation focussed by a second lens to the sensors, the mutual angle of reflecting mirror surfaces and the angle between the first and second slits being arranged so that outgoing radiation from the first slit reflected by one surface is retro-reflected via another surface to the second slit.

14. A system according to claim 5 in which three rotatable drum mirrors are arranged so that one pair scans for landmarks to produce the landmark location with respect to a plane and a third one scans for landmarks at right angles to the pair to provide a number of second signals indicative of the landmark position in three dimensions, each unit receiving broad band spectrum radiation form a common source through fibre-optic means.

15. A system according to claim 3 in which incoming retro-reflected radiation is split up and parts thereof, with the same spectral characteristics as the incoming radiation, are arranged to pass through a plurality of filters and the sensors measure the overall intensity of the split up radiation, the filters having edge filtering characteristics corresponding to those of the landmarks.

16. A system according to claim 4 in which incoming retro-reflected radiation is split up and parts thereof, with the same spectral characteristics as the incoming radiation, are arranged to pass through a plurality of filters and the sensors measure the overall intensity of the split up radiation, the filters having edge filtering characteristics corresponding to those of the landmarks.

17. A system according to claim 5 in which incoming retro-reflected radiation is split up and parts thereof, with the same spectral characteristics as the incoming radiation, are arranged to pass through a plurality of filters and the sensors measure the overall intensity of the split up radiation, the filters having edge filtering characteristics corresponding to those of the landmarks.

18. A system according to claim 6 in which incoming retro-reflected radiation is split up and parts thereof, with the same spectral characteristics as the incoming radiation, are arranged to pass through a plurality of filters and the sensors measure the overall intensity of the split up radiation, the filters having edge filtering characteristics corresponding to those of the landmarks.

19. A system according to claim 3 in which incoming retro-reflected radiation is led to a radiation diffraction means to split it up and parts thereof, each with distinct non-overlapping spectral ranges are arranged to impinge on the sensors to measure the intensity of the respective parts.

20. A system according to claim 4 in which incoming retro-reflected radiation is led to a radiation diffraction means to split it up and parts thereof, each with distinct non-overlapping spectral ranges are arranged to impinge on the sensors to measure the intensity of the respective parts.

21. A system according to claim 5 in which incoming retro-reflected radiation is led to a radiation diffraction means to split it up and parts thereof, each with distinct non-overlapping spectral ranges are arranged to impinge on the sensors to measure the intensity of the respective parts.

22. A system according to claim 6 in which incoming retro-reflected radiation is led to a radiation diffraction means to split it up and parts thereof, each with distinct non-overlapping spectral ranges are arranged to impinge on the sensors to measure the intensity of the respective parts.

23. An apparatus according to claim 3 including a source of broad-band radiation, a rotatable mirror, sensor and electronic network.

24. An apparatus according to claim 4 including a source of broad-band radiation, a rotatable mirror, sensor and electronic network.

25. An apparatus according to claim 5 including a source of broad-band radiation, a rotatable mirror, sensor and electronic network.

26. An apparatus according to claim 6 including a source of broad-band radiation, a rotatable mirror, sensor and electronic network.

27. An apparatus according to claim 7 including a source of broad-band radiation, a rotatable mirror, sensor and electronic network.

28. An apparatus according to claim 8 including a source of broad-band radiation, a rotatable mirror, sensor and electronic network.

29. An apparatus according to claim 3 including a retro-reflecting landmark of pyramidal shape having quadrangular base and an edge filtering characteristic.

30. An apparatus according to claim 4 including a retro-reflecting landmark of pyramidal shape having quadrangular base and an edge filtering characteristic.

31. An apparatus according to claim 5 including a retro-reflecting landmark of pyramidal shape having quadrangular base and an edge filtering characteristic.

32. An apparatus according to claim 6 including a retro-reflecting landmark of pyramidal shape having quadrangular base and an edge filtering characteristic.

33. An apparatus according to claim 7 including a retro-reflecting landmark of pyramidal shape having quadrangular base and an edge filtering characteristic.

34. An apparatus according to claim 8 including a retro-reflecting landmark of pyramidal shape having quadrangular base and an edge filtering characteristic.

35. An apparatus according to claim 9 including a retro-reflecting landmark of pyramidal shape having quadrangular base and an edge filtering characteristic.

36. An apparatus according to claim 2 including a retro-reflecting landmark of pyramidal shape having quadrangular base and an edge filtering characteristic.

37. A movement measuring system using a beam reflected by a rotating mirror to scan an observation field containing a retro-reflector and using a sensor arrangement responsive to retro-reflection to produce a signal related to the landmark location characterised in that outgoing radiation passes from a first slit onto a mirror having an axis of rotation parallel to the slit to produce a flat beam of radiation, and a second slit is provided parallel to the first for conveying retro-reflected radiation to a sensor, the mutual angle of reflecting mirror surfaces and the angle between the slits with respect to the mirror being arranged so that outgoing radiation reflected by one mirror surface is retro-reflected to another mirror surface by the retro-reflector and hence reflected to the second slit to thereby determine the angular position of the retro-reflector in the observation field by reference to the phase of mirror rotation at the time radiation is retro-reflected to the sensor arrangement.

38. A system according to claim 37 in which the retro-reflector is pyramidal with a quadrangular base having sides of from 10 to 18 mm.

39. A system according to claim 37 or 38 in which the rotatable mirror is rotated at a substantially constant speed and means are provided for detecting radiation reflected at a predetermined angular position and so producing a reference signal related to the phase of mirror rotation and a signal indicative of retro-reflector position is produced by reference to the time lag between the phase related signal and retro-reflection to the sensor arrangement.

40. A system according to claims 37, 38 or 36 in which first fibre optic means convey radiation from a generating means to positions along the length of the first slit and a first lens is located between the first slit and the mirror to collimate outgoing radiation and second fibre optic means are provided for conveying retro-reflected radiation from positions along the length of the second slit to the sensor arrangement after focussing by a lens between the mirror and the second slit.

41. A system according to claim 40 in which three rotatable drum mirrors are arranged so that one pair scans for landmarks to produce the location of the retro-reflector in a plane and a third one scans at right angles to provide a number of retro-reflected signals indicative of the position of the retro-reflector in three dimensions, each unit receiving radiation from a common source through fibre optic means.

42. An apparatus according to claims 37 or 38 or 36 including a source of radiation, a rotatable mirror, slits for outgoing and incoming light and a sensor arrangement.

43. An apparatus according to claims 37 or 38 or 36 including a retro-reflecting landmark having a pyramidal shape having a quadrangular base with sides of from 10 to 18 mm.

44. A system according to claim 39 in which first fibre optic means convey radiation from a generating means to positions along the length of the first slit and a first lens is located between the first slit and the mirror to collimate outgoing radiation and second fibre optic means are provided for conveying retro-reflected radiation from positions along the length of the second slit to the sensor arrangement after focussing by a lens between the mirror and the second slit.

45. A system according to claim 44 in which three rotatable drum mirrors are arranged so that one pair scans for landmarks to produce the location of the retro-reflector in a plane and a third one scans at right angles to provide a number of retro-reflected signals indicative of the position of the retro-reflector in three dimensions, each unit receiving radiation from a common source through fibre optic means.

46. An apparatus according to claim 39 including a source of radiation, a rotatable mirror, slits for outgoing and incoming light and a sensor arrangement.

47. An apparatus according to claim 40 including a source of radiation, a rotatable mirror, slits for outgoing and incoming light and a sensor arrangement.

48. An apparatus according to claim 41 including a source of radiation, a rotatable mirror, slits for outgoing and incoming light and a sensor arrangment.

49. An apparatus according to claim 39 including a retro-reflecting landmark having a pyramidal shape having a quadrangular base with sides of from 10 to 18 mm.

50. An apparatus according to claim 40 including a retro-reflecting landmark having a pyramidal shape having a quadrangular base with sides of from 10 to 18 mm.

51. An apparatus according to claim 41 including a retro-reflecting landmark having a pyramidal shape having a quadrangular base with sides of from 10 to 18 mm.

52. A movement measuring system having
(a) a means for producing a broad-band beam of electromagnetic radiation;
(b) three rotatable drum mirrors relatively displaced with respect to each other;
(c) fibre-optic means for conveying broad-band radiation from the radiation producing means for emission along the length of three narrow slits formed at the end of the fibre optic means parallel to the axes of rotation of the respective mirrors so that one pair of said mirrors scans for landmarks so as to produce a signal indication of the landmark position with respect to a plane and the third one of said mirrors scans for landmarks at right angles to said pair to produce a signal indicative of the landmark position in a third position;
(d) a plurality of retro-reflecting landmarks in an observation field for scanning by said mirrors, said landmarks each having an individual filtering characteristic for transmitting and reflecting incoming radiation with an edge where the transmission spectrum changes but collectively having mutually overlapping spectral ranges;
(e) means for splitting-up incoming retro-reflected radiation incident upon said mirrors and passing it upon reflection from the mirrors through a plurality of filters each having individual filtering characteristics with an edge where the transmission spectrum changes, said filter edges corresponding to landmark filter edges;
(f) sensor means associated with each of the filter means for detecting radiation which has been retro-reflected and filtered by the landmarks and filtered by the filter means and providing an output;
(g) an electronics conversion network for generating from a combination of said sensor outputs, obtained at the time a filtered part of broad-band spectrum is retro-reflected, a single signal specific to the respective landmarks.

* * * * *

UNITED STATES PATENT AND TRADEMARK OFFICE
CERTIFICATE OF CORRECTION

PATENT NO. : 4,486,095

DATED : December 4, 1984

INVENTOR(S) : DAVID LLOYD MITCHELSON

It is certified that error appears in the above-identified patent and that said Letters Patent is hereby corrected as shown below:

Column 12, line 41, change "form" to --from--.

Signed and Sealed this

Thirteenth Day of August 1985

[SEAL]

Attest:

DONALD J. QUIGG

Attesting Officer

Acting Commissioner of Patents and Trademarks